L. W. EVERHART.
INCUBATOR.
APPLICATION FILED JULY 10, 1911.
1,058,852.
Patented Apr. 15, 1913.
2 SHEETS—SHEET 2.
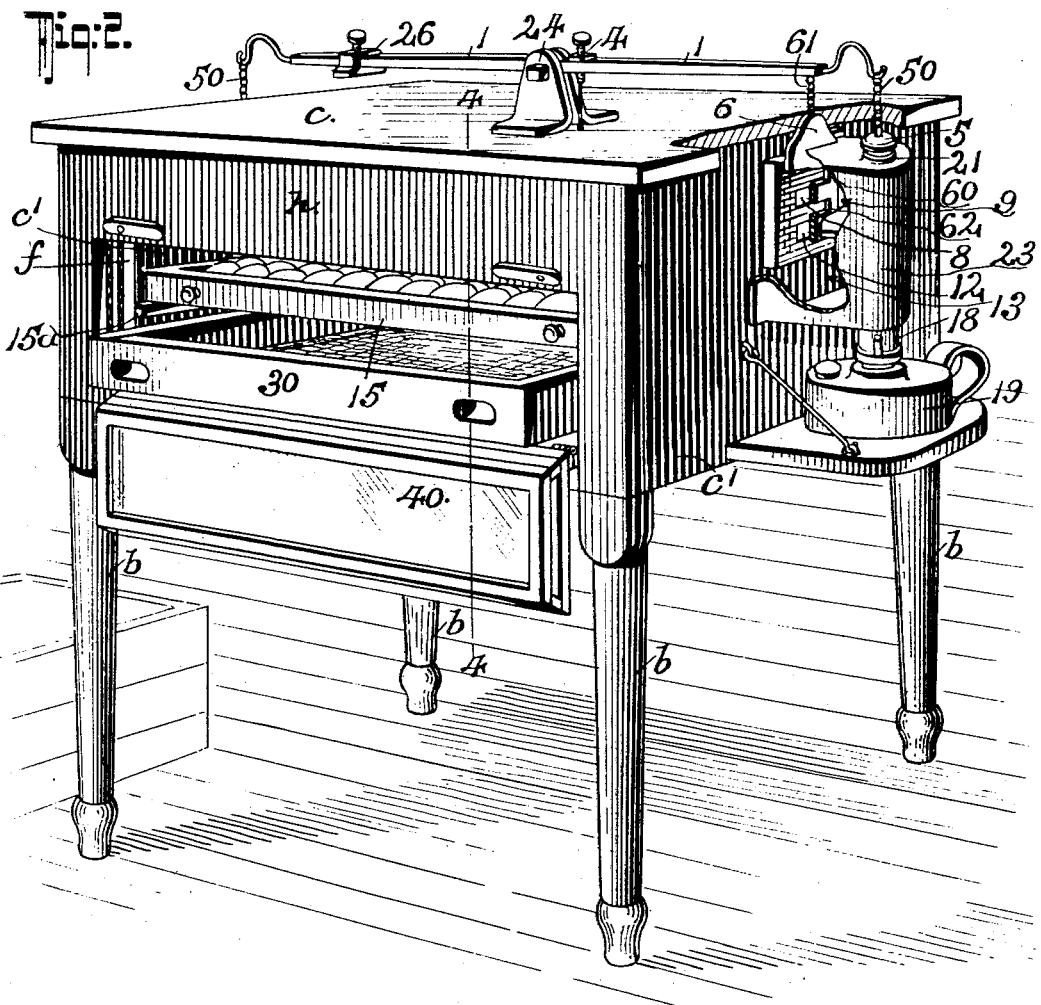
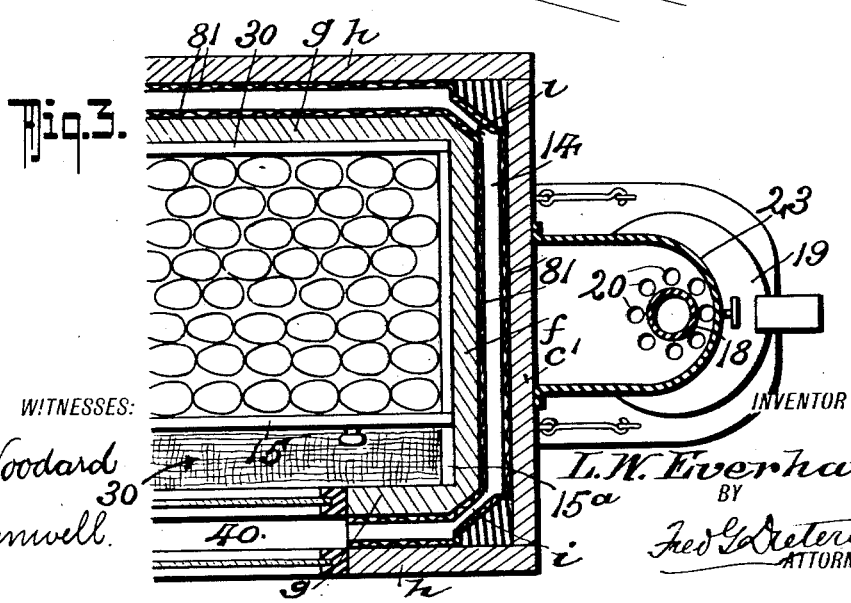

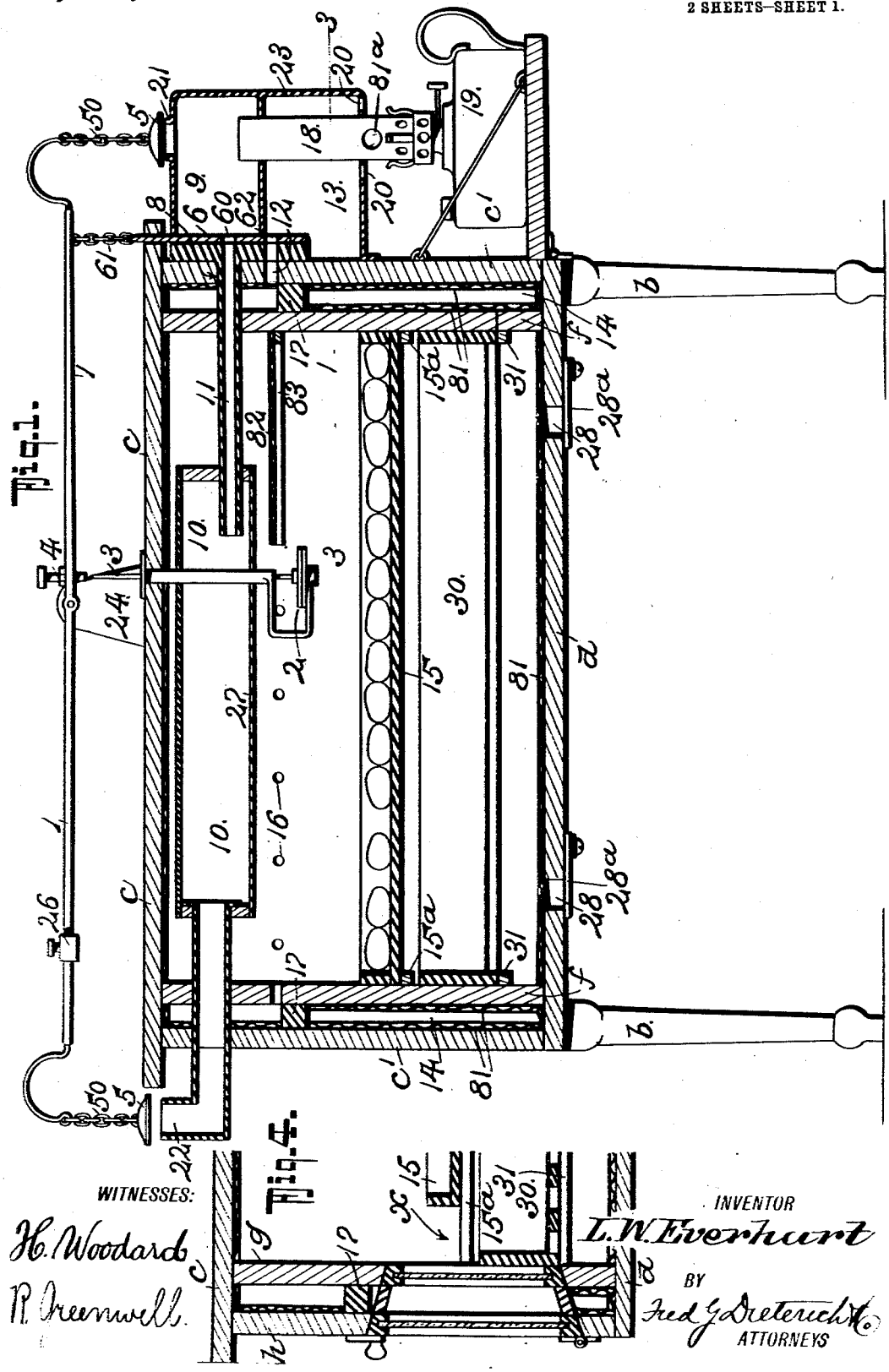

UNITED STATES PATENT OFFICE.

LOGAN W. EVERHART, OF FORT SCOTT, KANSAS.

INCUBATOR.

1,058,852.     Specification of Letters Patent.     Patented Apr. 15, 1913.

Application filed July 10, 1911. Serial No. 637,722.

*To all whom it may concern:*

Be it known that I, LOGAN W. EVERHART, a citizen of the United States, residing at Fort Scott, in the county of Bourbon and State of Kansas, have invented a new and Improved Incubator, of which the following is a specification.

The object of my invention is to provide an improved construction of incubator in which special provision is made for maintaining an even and uniform temperature in the incubating chamber regardless of the capacity of the said chamber and in which the heating and ventilating elements are so arranged and combined that the control of the apparatus, to suit the varying conditions thereof is automatically and positively effected and without the necessity of the careful attendance of an operator.

Another object of my invention is to provide an incubating apparatus having the parts especially designed and coöperatively connected, whereby the construction thereof is simple and inexpensive and yet of sufficient durability and strength to stand the ordinary handling and use of the apparatus without danger of a disorganization or breaking of the said parts.

Again, my invention has for its object to provide an improved incubating apparatus in which is included a new and improved arrangement of the incubating chamber, the egg tray and a nursery drawer for taking care of the chicks as they hatch and with other objects in view that will hereinafter appear, my invention comprises an incubator that embodies the peculiar and novel combination and detailed arrangement of parts, all of which will be first described and claimed and illustrated in the accompanying drawings, in which:

Figure 1, is a vertical longitudinal section of my improved construction of incubator, the parts being shown at an operative position. Fig. 2, is a perspective view of the same, parts being shown in section, and in the position for cutting off the hot air to the heating chamber. Fig. 3, is a horizontal section of one end of the same on the line 3—3 on Fig. 1. Fig. 4, is a transverse section thereof on the line 4—4 on Fig. 2, the door being closed.

In the general construction the incubator body, the casing $a$, is of the conventional elongated form mounted on strong legs, $b$—$b$, the top board $c$ being solid and the bottom board $d$ provided with vents 28 hereinafter again referred to.

$c'$—$c'$ designate the outer end walls, $f$, $f$ the inner end walls and $g$ and $h$ the inner and outer side walls they being so positioned that the usual air space 14 surrounds the inner or incubator casing proper, the end and side spaces being connected so the double wall feature extends entirely around the corner, the bearings being cut out and the meeting ends of the end the side and inner walls being joined by angle boards $i$—$i$, as is clearly shown in Fig. 3, by reference to which and to Fig. 1, it will be noticed the said space 14 is divided by a horizontal strip 17 that is so disposed, relatively to the hot air intake for the space 14 so as to confine the hot air to the upper part of the said space 14.

1 designates the regulating lever mounted on top of the casing in a bracket 24 to swing vertically and the said lever extends full length of the casing, each of its ends having a flexible hanger 50 each of which in turn supports a damper or cut off valve 5, 5 one of which coöperates with the waste heat outlet 21 and the other with the main or blow off outlet 22 from the main heating chamber 10.

2 designates a thermostat that is located in the incubator chamber and which may be of any approved construction. The same in the drawings includes a shifting wire or rod that coöperates with the thermostat and with an adjusting screw device 4 on the lever 1, as is clearly shown in Fig. 1.

One of the outer end walls has two openings, an upper one 8 and a lower one 12, which openings extend through a metal face plate. The lower opening 12 communicates with the cold air chamber 13 and the upper opening communicates with the hot air chamber 9 of the heat generating devices, the construction of which is clearly shown in Figs. 1 and 2, by reference to which it will be noticed a lamp 19 is mounted on a hinged bracket and has its chimney 18 projected into the hot air space 9 of the casing 23 that has the outlet 21 before referred to. The chimney 18 which has a flame sight opening 81$^a$ also passes through a fresh air warming chamber 13 that communicates through the opening 12 with an air space 14, it also having fresh air inlets 20—20 in the bottom plate as shown.

The inner wall, that forms the hot air chamber, has small apertures 16 through which the heated air from the casing 23 passes. Within the hot air chamber referred to, are cleats 15ª for supporting the egg tray 15 and the said cleats are sufficiently above the bottom of the incubator casing to allow the insertion of a nursery drawer or drawers, 30, which slide on cleats 31 so the bottom of the said drawer is in a plane above the incubator bottom to provide an air space between the nursery drawer and the bottom from which the odor or foul air from the incubator tray and the nursery drawer may readily pass out through the vent 28, before mentioned. The opposite side of the incubator casing has the usual glass doors 40 and they, in my construction, are hinged sufficiently low to swing downwardly to permit of the convenient insertion and removal of the egg and nursery trays or drawer. By referring now to Fig. 4, it will be noticed the egg tray is a width somewhat less than that of the casing so as to provide a space x between the front end of the egg tray and the glass front, that is sufficiently large to permit the newly hatched chicks, as they creep out of the egg tray to drop down between the said tray and the glass front and into the nursery drawer which is under the egg tray. In practice, the nursery drawer rests about one-half of an inch above the bottom of the incubator to leave an air space below the said nursery drawer and the bottom of the said nursery drawer is slatted and covered with burlap or any other material.

The ventilating hole 28 in the incubator bottom has a pivoted valve plate 28ª for regulating the size of the said hole 28 to provide for the proper ventilation of the egg chamber and nursery, it being understood that as the warm air spreads out over the egg tray and gradually passes below it the poisonous gases from the incubating eggs pass off through the said aperture 28.

11 designates a pipe that passes through the opening 8 and connects the heating space 9 with the heating chamber 10, the latter having a sheet metal diaphragm 27 that separates the egg and hot air chambers and by means of its radiation maintains the desired heating of the said egg chamber.

Coöperating with the openings 8 and 12 is a slide plate 6 that has apertures 60 and 62 arranged to coact with the openings 8 and 12, and the said plate is connected to a flexible hanger 61 suspended from the adjacent end of the regulating lever.

26 designates a counterbalance adjustably mounted on the outer end of the lever 1.

From the foregoing, taken in connection with the drawings, the complete construction and the advantages of my invention will be readily understood by those skilled in the art to which it relates. By reason of the construction described, the operation of maintaining the uniform and desired temperature as also properly ventilating the incubator is readily provided for.

In the practical operation of my invention, the cold air enters the chamber 13 and thence, in a warmed state, passes out into the air space 14 and from thence into the incubating or egg heating chamber. The products of combustion from the lamp pass through the pipe 11 into a hot air chamber that has the metal diaphragm which forms the top of the heating chamber and by its radiated heat brings and holds the temperature in the hatching chamber to and at the desired degree, the smoke passing off through the outlet 22. Now should the temperature within the incubating chamber rise above the predetermined point, the thermostatic action will cause the regulating lever to lift the slide plate 6 and the valve 5 over the vent 21, thereby cutting off the openings 8 and 12 to the space 14 and at the same time permitting the combustion heat from the lamp to pass out through the vent 21. As one end of the lever rises, as stated, the other end falls to allow the valve 5 attached thereto to drop down onto and close the outlet 22 from the heating chamber 10 and thereby retain the heat within the said chamber, it being manifest that as the heat drops within the said chamber below the desired or predetermined point, the thermostatic action causes the lever 1 to swing in an opposite direction and in consequence reestablish communication between the air warming and feeding means and between the chamber 10 and the heater chamber 9.

81 designates an insulation lining that extends entirely around the sides, top and bottom of the air space 14, and the said insulation is preferably in the nature of corrugated paper, a similar insulation also covering the bottom and top walls of the incubating chamber.

82 designates a heat spreader or distributer which is also preferably of corrugated paper mounted on a frame 83 that projects inwardly from the lamp and of the incubating chamber toward the thermostat near which it ends. By providing a spreader arranged as shown, a partition is provided which not alone acts as a shield for the eggs in that end of the tray next to the lamp, but also deflects the heat toward the cooler end and distributes the same over the said cooler end of the tray, and thereby equalizing exactly the temperature in the two ends of the egg chamber. The door is held closed by turn buttons and is provided with a suitable finger hold.

What I claim is:—

1. In an incubator, the combination with an egg chamber, a hot air chamber within the said egg chamber, said hot air chamber having an outlet, a heater having an offtake that discharges into the hot air chamber and a waste heat outlet, an inlet for conveying fresh air into the egg chamber, a valve for the fresh air inlet, a valve for the hot air offtake, and a valve for the waste heat outlet, and another valve for the hot air chamber outlet, and a thermostatic regulating lever connected with the several valves and adapted to simultaneously close off the fresh air inlet, the hot air offtake and the waste heat outlet, and to open the outlet from the hot air chamber.

2. In an incubator; a hot air chamber located in the egg chamber thereof, said chamber having inlets, a main fresh air inlet port common to all of the inlets for the egg chamber, a hot air supply pipe that extends into the hot air chamber, said hot air chamber having a discharge offtake, a waste heat outlet in communication with the hot air supply pipe, a valve for the said waste heat outlet, a valve for controlling the supply pipe to the hot air chamber, and the main fresh air inlet, and a thermostatic controlling lever connected with the several valves and adapted for closing the hot air and cold air inlets and simultaneously opening the offtake from the hot air chamber.

3. In an incubator; a hot air chamber located in the egg chamber, said hot air chamber having a supply pipe at one end and an exit pipe at the other end, a waste heat outlet in communication with the supply pipe, a valve for the waste heat outlet, a valve for the exit pipe of the hot air chamber, a thermostatic controlling lever connected with the valves adapted for alternately moving the waste heat outlet valve to its closing position as it moves the valve for the exit pipe for the hot air chamber to the open position, and another means for simultaneously closing off the hot air supply pipe and the fresh air supply to the hot air chamber, and the egg chamber respectively, as the valve for the hot air chamber exit pipe is opened.

4. In an incubator; the combination with an egg chamber, a hot air chamber within the upper part of the said egg chamber, said hot air chamber having a supply pipe and an exit pipe, said supply pipe having a waste heat escape, of a rockably mounted thermostatic regulating lever arranged to be simultaneously and oppositely moved to open and close the supply and exit for the hot air chamber, and a supplemental means coöperatively connected with the said regulating lever for simultan ously closing off the fresh air feed to the egg chamber as the hot air supply is cut off to the hot air chamber.

LOGAN W. EVERHART.

Witnesses:
   Geo. W. Everhart,
   Wm. Rollings.